United States Patent [19]

Yokogawa et al.

[11] Patent Number: 4,880,431
[45] Date of Patent: Nov. 14, 1989

[54] ARYL MONOAZO PYRIDONE YELLOW COMPOUND HAVING TWO VINYLSULFONE TYPE FIBER REACTIVE GROUPS BONDED TO A TRIAZINE RING FOR DYEING CELLULOSE OR POLYAMIDE

[75] Inventors: Kazufumi Yokogawa, Minoo; Naoki Harada, Suita; Takashi Omura, Ashiya, all of Japan

[73] Assignee: Sumitomo Chemical Company, Limited, Osaka, Japan

[21] Appl. No.: 130,293

[22] Filed: Dec. 8, 1987

[30] Foreign Application Priority Data

Dec. 24, 1986 [JP] Japan ................. 61-310455

[51] Int. Cl.$^4$ .................. C09B 62/51; D06P 1/38
[52] U.S. Cl. ........................... 8/549; 8/543;
8/682; 8/683; 8/684; 8/688; 8/918; 8/924;
534/642; 534/644; 534/753; 534/770; 534/771;
534/772; 534/778; 534/780; 534/781; 534/784;
534/798
[58] Field of Search ............... 534/642, 635, 644, 753,
534/772, 780, 784, 798; 8/549

[56] References Cited

U.S. PATENT DOCUMENTS

| | | | |
|---|---|---|---|
| 3,936,436 | 2/1976 | Berrie et al. | 534/635 |
| 4,299,764 | 11/1981 | Jager | 534/635 |
| 4,618,671 | 10/1986 | Kayane et al. | 534/635 |
| 4,644,058 | 2/1987 | Shimidzu et al. | 534/635 |
| 4,701,524 | 10/1987 | Kayane et al. | 534/642 |

FOREIGN PATENT DOCUMENTS

| | | |
|---|---|---|
| 76782 | 4/1983 | European Pat. Off. |
| 0182366 | 5/1986 | European Pat. Off. |
| 56-037379 | 4/1981 | Japan . |
| 56-092961 | 7/1981 | Japan . |
| 56-159373 | 12/1981 | Japan . |
| 2026527 | 2/1980 | United Kingdom . |

OTHER PUBLICATIONS

Chemical Abstracts, vol. 71, 1969, p. 76, No. 14158k.

Science and Industry, vol. 42, No. 11, 1968, pp. 583–594.

*Primary Examiner*—A. Lionel Clingman
*Attorney, Agent, or Firm*—Stevens, Davis, Miller & Mosher

[57] ABSTRACT

A monoazo compound of the following formula,

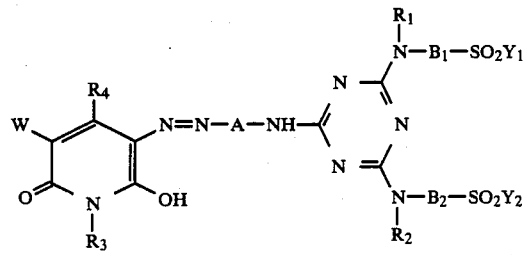

wherein $R_1$, $R_2$ and $R_3$ are independently hydrogen or alkyl, $R_4$ is alkyl or carboxy, A is

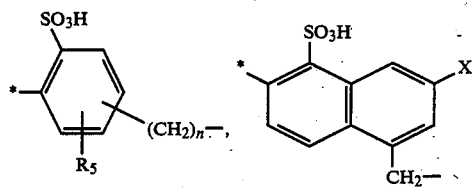

in which $R_5$ is hydrogen, methyl, methoxy, ethoxy, sulfo or carboxy, X is hydrogen or sulfo, n is 0 or 1, and the asterisked linkage bonds to the azo group, $B_1$ and $B_2$ are independently phenylene or naphthylene, W is hydrogen, carbamoyl, sulfoalkyl, cyano, sulfo, chloro or bromo, and $Y_1$ and $Y_2$ are independently —CH=CH$_2$, —CH$_2$CH$_2$OSO$_3$H or the like, which is useful for dyeing hydroxy group- or carbonamide group-containing materials in a deep yellow color excellent in various fastness properties such as light fastness, perspiration-light fastness and chlorine fastness.

10 Claims, No Drawings

ARYL MONOAZO PYRIDONE YELLOW COMPOUND HAVING TWO VINYLSULFONE TYPE FIBER REACTIVE GROUPS BONDED TO A TRIAZINE RING FOR DYEING CELLULOSE OR POLYAMIDE

The present invention relates to a water soluble monoazo compound, a process for producing the same and a process for dyeing or printing fiber materials using the same. More specifically, the present invention relates to a monoazo compound having two vinylsulfone type fiber reactive groups per molecule, which is particularly useful for dyeing or printing hydroxy group- and/or carbonamide group-containing materials, particularly those such as cellulose fiber, natural or synthetic polyamide or polyurethane fiber, leather or the like, or mixed fibers thereof.

Reactive dyes, particularly those having a socalled vinylsulfone type fiber reactive group, have been extensively used for dyeing or printing cellulose fiber or polyamide fiber, because of being applicable to various kinds of dyeing and printing methods and providing dyed and printed products of a brilliant color superior in wet fastness properties.

For example, in U.S. Pat. Nos. 4,618,671 and 4,644,058 and European Patent Publication No. 182366, reactive dyes having the vinylsulfone type fiber reactive group are disclosed.

In recent years, the need for the build-up property of dyes have become severe from viewpoint of dyeing costs and waste water treatment in dye houses. Thus, the dyes of this kind also await improvements in particularly the build-up property.

The present inventors have undertaken extensive studies to find a dye of this kind superior in various dye performance such as fastness properties, level-dyeing property, water solubility or the like as well as buildup property, and as a result have found a specific compound meeting the needs described above.

The present invention relates to a monoazo compound represented by the following formula (I),

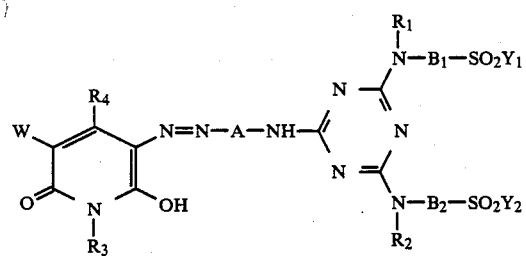 (I)

wherein $R_1$ and $R_2$ independently of one another are each hydrogen or unsubstituted or substituted alkyl, $R_3$ is hydrogen or alkyl, $R_4$ is alkyl or carboxy, A is a divalent group represented by the following formula (II) or (III) in each free acid form,

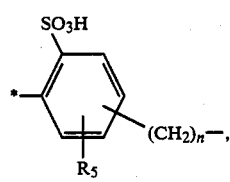 (II)

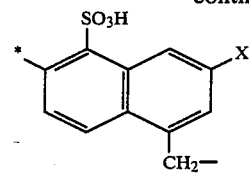 (III)

in which $R_5$ is hydrogen, methyl, methoxy, ethoxy, sulfo or carboxy, X is hydrogen or sulfo, n is 0 or 1, and the asterisked linkage bonds to the azo group, $B_1$ and $B_2$ independently of one another are each phenylene unsubstituted or substituted once or twice by methyl, methoxy, ethyl, ethoxy, chloro, bromo, sulfo or carboxy, or naphthylene unsubstituted or substituted by sulfo, W is hydrogen, carbamoyl, sulfoalkyl, cyano, sulfo, chloro or bromo, and $Y_1$ and $Y_2$ independently of one another are each —CH=CH$_2$ or —CH$_2$CH$_2$Z in which Z is a group splittable by the action of an alkali, and a process for producing the monoazo compound of the formula (I), which comprises reacting a cyanuric halide, a diamine compound represented by the following formula (IV), $$NH_2-A-NH_2 \quad (IV)$$

wherein A is as defined above, an amine compound represented by the following formula (V),

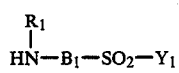 (V)

wherein $R_1$, $B_1$ and $Y_1$ are as defined above, another amine compound represented by the following formula (VI),

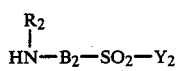 (VI)

wherein $R_2$, $B_2$ and $Y_2$ are as defined above, and a pyridone compound represented by the following formula (VII),

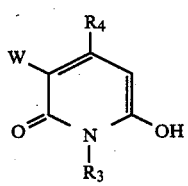 (VII)

wherein $R_3$, $R_4$ and W are as defined above, in an aqueous medium.

The present invention also provides a process for dyeing or printing hydroxy group- or carbonamide group- containing materials, which comprises using the monoazo compound of the formula (I).

In the above formula (I), the alkyl represented by $R_1$ and $R_2$ is preferably the one having 1 to 4 carbon atoms, which is unsubstituted or substituted by hydroxy, cyano, $C_{1-4}$ alkoxy, halogeno, carboxy, carbamoyl, $C_{1-4}$ alkoxycarbonyl, $C_{1-4}$ alkylcarbonyloxy, sulfo, sulfamoyl or the like. Examples thereof are the same as disclosed in Published Unexamined Japanese Patent Application No. 122549/1984. Of these alkyl groups, preferred are methyl and ethyl. In the present invention, any one of $R_1$ and $R_2$ is preferably hydrogen.

The alkyl represented by $R_3$ and $R_4$ is preferably the one having 1 to 4 carbon atoms, and includes, for example, methyl, ethyl, n-propyl, iso-butyl, sec-butyl and the like. Of these, preferred are methyl, ethyl and n-propyl. In the present invention, particularly preferred is a case where $R_3$ is methyl or ethyl and $R_4$ is methyl or carboxy.

Among the divalent groups A represented by the formula (II), preferred is the one represented by the following formula,

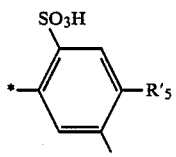

wherein the asterisked linkage is as defined above, and $R'_5$ is hydrogen, methyl, methoxy, sulfo or carboxy, preferably hydrogen or sulfo.

Examples of the phenylene and naphthylene unsubstituted or substituted, which are represented by $B_1$ and $B_2$ are as shown in the specification of Published unexamined Japanese Patent Application No. 122549/1984. Of these, particularly preferred is phenylene unsubstituted or substituted once or twice by methyl and methoxy.

The symbol Z in —$CH_2CH_2Z$ which is represented by $Y_1$ and $Y_2$ denotes a group capable of being split by the action of an alkali, and includes various groups known per se, such as sulfato, thiosulfato, phosphato, acetoxy, chloro and the like. Of these groups represented by $Y_1$ and $Y_2$, preferred is β-sulfatoethyl. In the present invention, the most preferred is a case where both $Y_1$ and $Y_2$ are β-sulfatoethyl, which may be partially replaced by vinyl.

With respect to the symbol W, preferred are hydrogen, sulfoalkyl such as sulfomethyl, sulfoethyl and the like, sulfo, chloro and bromo. Of these, particularly preferred is hydrogen.

Among the monoazo compounds of the formula (I), preferred are those represented by the following formulas (I-1) and (I-2) in each free acid form,

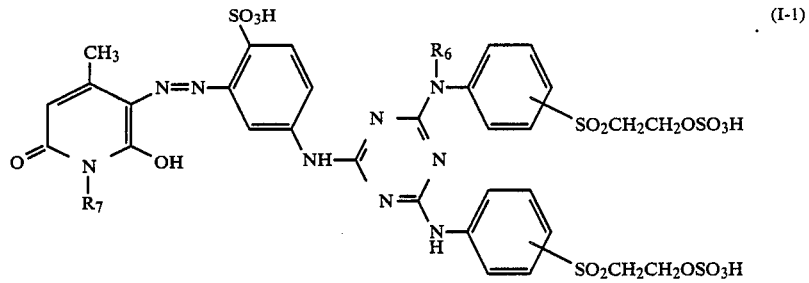

wherein $R_6$ is hydrogen, methyl or ethyl, and $R_7$ is methyl or ethyl;

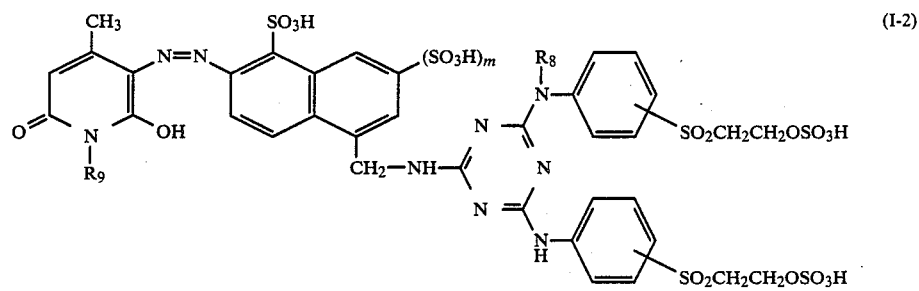

wherein $R_8$ is hydrogen, methyl or ethyl, $R_9$ is methyl or ethyl, and m is 0 or 1.

In the above formulas (I-1) and (I-2), the sulfatoethylsulfonyl (—$SO_2CH_2CH_2OSO_3H$) may be replaced by vinylsulfonyl (—$SO_2CH=CH_2$) in part.

The present monoazo compound of the formula (I) may be in the form of a free acid or an alkali metal or alkaline earth metal salt, preferably an alkali metal salt such as sodium and potassium salts.

The present monoazo compound (I) can be produced in a manner known per se. For example, any one of the diamine compounds of the formula (IV) and the amine compound of the formula (V) is subjected to a first condensation with a cyanuric halide such as cyanuric chloride and cyanuric fluoride, followed by a second condensations with the remaining one of the above two. The first and second condensation can be carried out in gan aqueous medium at a temperature of 0° to 30° C. and 20° to 60° C., respectively. Successively, the resulting monohalogenotriazinyl compound represented by the following formula (XII),

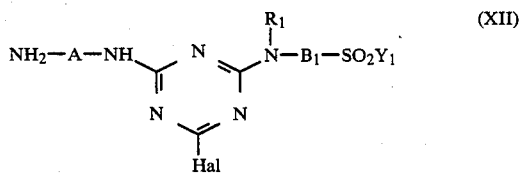

wherein A, $R_1$, $B_1$ and $Y_1$ are as defined above, and Hal is halogeno such as chloro, fluoro and the like is diazotized in a conventional manner, followed by coupling with the pyridone compound of the formula (VII) at a temperature of 0° to 30° C., thereby obtaining a monoazo intermediate compound represented by the following formula (XIII),

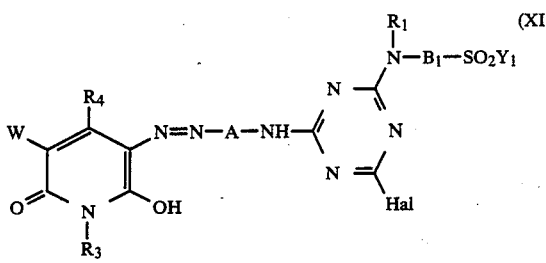

wherein $R_1$, $R_3$, $R_4$, A, $B_1$, $Y_1$, W and Hal are as defined above. The resulting monoazo intermediate compound is subjected to a third condensation with another amine compound of the formula (VI) at a temperature of 60° to 100° C., whereby the desired monoazo compound (I) can be produced.

The present monoazo compound (I) can also be produced in another manner. For example, a monoacyl compound of the diamine compound (IV) is diazotized in a conventional manner, followed by coupling with the pyridone compound (VII), and then deacylation, thereby obtaining another monoazo intermediate compound represented by the following formula (XIV),

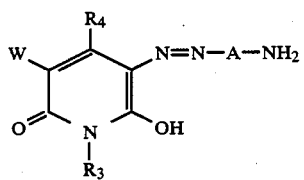

wherein $R_3$, $R_4$, A and W are as defined above.

Successively, any one of the monoazo intermediate compound (XIV), the amine compound (V) and another amine compound (VI) is subjected to a first condensation with the cyanuric halide, followed by second and third condensations with the remaining, whereby the desired monoazo compound (I) can be also produced.

The starting compounds described above may be used in the form of a free acid or a salt, particularly those such as alkali metal or alkaline earth metal salts, depending on the reaction conditions.

After completion of the reaction mentioned above, the desired monoazo compound (I)-containing reaction mixture may be formed to a liquid commercial product, if desired, after removing inorganic salts and with the addition of a stabilizer or a dyeing improver. The liquid product obtained or the reaction mixture as such may be subjected to evaporation or spray-drying, thereby obtaining a pulverulent commercial product. Alternatively, the reaction mixture may be formed to either a liquid or pulverulent commercial product through salting-out using an electrolyte in a conventional manner.

The monoazo compound (I) of the present invention is fiber-reactive and useful for dyeing or printing hydroxyl group-containing and carbonamide group-containing materials in a fibrous form including unmixed or mixed fibers.

The hydroxyl group-containing materials include natural or synthetic hydroxyl group-containing materials such as cellulose fiber materials, regenerated products thereof and polyvinyl alcohol. Examples of the cellulose fiber materials are cotton and other vegetable fibers such as linen, hemp, jute and ramie fibers. Examples of the regenerated cellulose fibers are viscose staple and filament viscose.

The amide group-containing materials include synthetic or natural polyamide and polyurethane. Examples of the materials, particularly in the fibrous forms, are wool and other animal furs, silk, leather, polyamide-6,6, polyamide-6, polyamide-11 and polyamide-4.

The dyeing may be carried out in a suitable manner, which can be selected from conventional manners.

For example, cellulose fibers can be dyed using the monoazo compound (I) and an acid binding agent such as sodium hydroxide, sodium carbonate, phosphates, silicates or sodium hydrogencarbonate. The dyeing may be carried out in a suitable manner, which can be selected from conventional ones depending on the physical and chemical properties of the fiber materials, and includes, for example, exhaustion dyeing, printing and padding including cold-pad-batch-up dyeing.

The exhaustion dyeing can be carried out at a relatively low temperature in the presence of an acid binding agent such as sodium carbonate, trisodium phosphate, sodium hydroxide and the like, together with sodium sulfate, sodium chloride or the like.

The printing can be carried out by printing the fibers with a color paste, followed by pre-drying and heat-treatment such as steaming. The color paste can be prepared in a conventional manner using a thickener or emulsion thickener such as sodium alginate, starch ether or the like, and an alkali or alkaligenerating agent such as sodium carbonate, sodium hydrogencarbonate, trisodium phosphate, sodium trichloroacetate and their potassium or alkaline earth metal salts, if desired, together with a usual printing auxiliary agent such as urea and a dispersing agent.

The cold-pad-batch-up dyeing can be carried out by padding the fiber materials with a padding liquor at ambient temperature, batching up and allowing to stand on a roller for 3 hours or more or over night, followed by washing with water and drying.

The dyeing of natural or snythetic polyamide and polyurethane fiber materials can be carried out by performing exhaustion in an acid or weak acid bath, while controlling the pH value, and then making the bath neutral, or in some cases alkaline to perform the fixation. The dyeing temperature ranges usually from 60° to 120° C. In order to achieve a level dyeing, there may be used a conventional level dyeing agent such as a condensation product between cyanuric chloride and 3 times by mole of aminobenzenesulfonic acid or aminonaphthalenesulfonic acid, or an addition product between stearylamine and ethylene oxide, and the like.

The present monoazo compound (I) can be characterized by excellent dye performance in the dyeing and printing of fiber materials, particularly cellulose fiber materials. For example, the compound can exhibit extremely high exhaustion and fixation percentages as well as extremely excellent build-up property. Moreover, the compound can also exhibit excellent level-dyeing and washing-off properties. Furthermore, the compound can hardly be affected by changes in dyebath conditions such as temperature, bath ratio, pH and salt concentration to some extent, and can produce dyed or printed products excellent in various fastness properties, such as light fastness, perspiration-light fastness, perspiration fastness, acid-hydrolysis fastness, washing fastness, chlorine fastness and the like.

The present invention is illustrated in more detail with reference to the following Examples which are only illustrative, but not limitative. In Examples, all parts and % are by weight.

EXAMPLE 1

A solution of m-phenylenediaminesulfonic acid (5.6 parts) in water (100 parts) was added to an aqueous dispersion of cyanuric chloride (5.5 parts), and the mixture was stirred under cooling to complete a first condensation. Thereafter, to this reaction mixture was added N-ethylaniline-3-β-sulfatoethylsulfone (9.2 parts), and the mixture was stirred for 5 hours to complete a second condensation. Successively, the reaction mixture was mixed with sodium nitrite to carry out a diazotization in a conventional manner. The resulting diazonium salt solution was added to an aqueous dispersion of 1-ethyl-4-methyl-6-hydroxy-2-pyridone (4.6 parts) to perform a coupling reaction. After completion of the coupling reaction, 1-aminobenzene-3-β-sulfato-ethylsulfone (8.4 parts) was added thereto, and the mixture was stirred at 50° to 80° C. to complete a third condensation. Thereafter, sodium chloride was added to the reaction mixture, and the precipitate separated on a filter was dried to obtain a monoazo compound represented by the following formula.

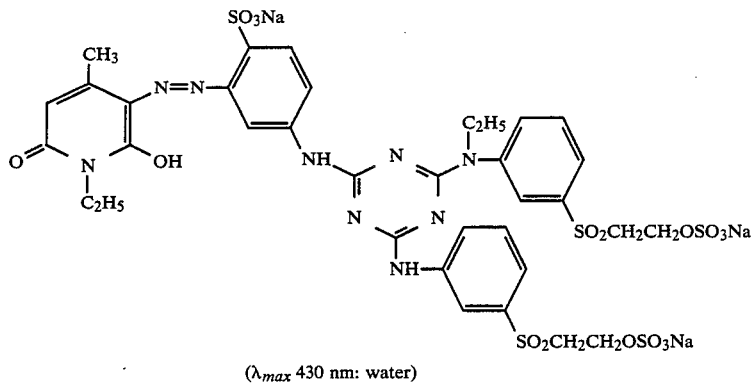

($\lambda_{max}$ 430 nm: water)

EXAMPLE 2

Example 1 was repeated, provided that 2-amino-5-aminomethylnaphthalene-1-sulfonic acid was used in place of m-phenylenediaminesulfonic acid, thereby obtaining a monoazo compound represented by the following formula.

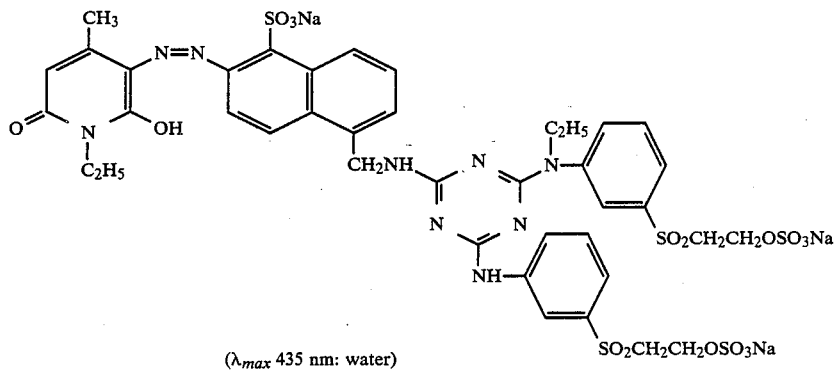

($\lambda_{max}$ 435 nm: water)

EXAMPLE 3

Example 1 was repeated, provided that the diamine compound (to be subjected to a first condensation with cyanuric chloride) as shown in a column A of the following table, the amine compound (to be subjected to a second condensation) as shown in a column B, the pyridone compound (to be coupled) as shown in a column C and another amine compound (to be subjected to a third condensation) as shown in a column D were used, thereby obtaining the corresponding monoazo compound characterized by a shade on cellulose fiber as shown in a column E.

| No. | A<br>Diamine<br>compound | B<br>Amine<br>compound | C<br>Pyridone<br>compound | D<br>Another<br>amine compound | E<br>Shade on<br>cellulose<br>fiber |
| --- | --- | --- | --- | --- | --- |
| 1 | 2,4-Diamino-benzenesulfonic acid | 1-Aminobenzene-4-β-sulfato-ethylsulfone | 1-Ethyl-4-methyl-6-hydroxy-2-pyridone | 1-Aminobenzene-3-β-sulfato-ethylsulfone | Yellow |
| 2 | 2,4-Diamino-benzenesulfonic | 1-Aminobenzene-3-β-sulfato- | 1-Ethyl-4-methyl-6- | 1-Aminobenzene-3-β-sulfato- | " |

-continued

| No. | A Diamine compound | B Amine compound | C Pyridone compound | D Another amine compound | E Shade on cellulose fiber |
|---|---|---|---|---|---|
| | acid | ethylsulfone | hydroxy-2-pyridone | ethylsulfone | |
| 3 | 2,4-Diaminobenzenesulfonic acid | N—Ethylaniline-3-β-sulfato-ethylsulfone | 1-Ethyl-4-methyl-6-hydroxy-2-pyridone | 1-Aminobenzene-4-β-sulfato-ethylsulfone | " |
| 4 | 2,4-Diaminobenzenesulfonic acid | 1-Aminobenzene-4-β-sulfato-ethylsulfone | 1-Ethyl-4-methyl-6-hydroxy-2-pyridone | 1-Aminobenzene-4-β-sulfato-ethylsulfone | " |
| 5 | 2,4-Diaminobenzenesulfonic acid | N—Ethylaniline-4-β-sulfato-ethylsulfone | 1-Ethyl-4-methyl-6-hydroxy-2-pyridone | 1-Aminobenzene-3-β-sulfato-ethylsulfone | " |
| 6 | 2,4-Diaminobenzenesulfonic acid | N—Ethylaniline-4-β-sulfato-ethylsulfone | 1-Ethyl-4-methyl-6-hydroxy-2-pyridone | 1-Aminobenzene-4-β-sulfato-ethylsulfone | " |
| 7 | 2,4-Diaminobenzenesulfonic acid | 2-Aminonaphthalene-6-β-sulfatoethyl-sulfone-1-sulfonic acid | 1-Ethyl-4-methyl-6-hydroxy-2-pyridone | 1-Aminobenzene-4-β-sulfato-ethylsulfone | " |
| 8 | 2,4-Diaminobenzenesulfonic acid | 2-Aminonaphthalene-6-β-sulfatoethyl-sulfone-1-sulfonic acid | 1-Ethyl-4-methyl-6-hydroxy-2-pyridone | 1-Aminobenzene-3-β-sulfato-ethylsulfone | " |
| 9 | 2,4-Diaminobenzenesulfonic acid | 1-Aminobenzene-4-β-sulfato-ethylsulfone | 1-Ethyl-4-methyl-6-hydroxy-2-pyridone | 1-Amino-4-methoxybenzene-3-β-sulfato-ethylsulfone | " |
| 10 | 2,4-Diaminobenzenesulfonic acid | 1-Aminobenzene-3-β-sulfato-ethylsulfone | 1-Ethyl-4-methyl-6-hydroxy-2-pyridone | 1-Amino-4-methoxybenzene-3-β-sulfato-ethylsulfone | " |
| 11 | 2,4-Diaminobenzenesulfonic acid | 2-Aminonaphthalene-8-β-sulfatoethyl-sulfone-6-sulfonic acid | 1-Ethyl-4-methyl-6-hydroxy-2-pyridone | 1-Aminobenzene-3-β-sulfato-ethylsulfone | " |
| 12 | 2,4-Diaminobenzenesulfonic acid | 1-Amino-2-methoxybenzene-5-β-sulfato-ethylsulfone | 1-Ethyl-4-methyl-6-hydroxy-2-pyridone | 1-Aminobenzene-3-β-sulfato-ethylsulfone | " |
| 13 | 2,5-Diaminobenzenesulfonic acid | N—Ethylaniline-3-β-sulfato-ethylsulfone | 1-Ethyl-4-methyl-6-hydroxy-2-pyridone | 1-Aminobenzene-3-β-sulfato-ethylsulfone | " |
| 14 | 2,5-Diaminobenzenesulfonic acid | N—Ethylaniline-3-β-sulfato-ethylsulfone | 1-Ethyl-4-methyl-6-hydroxy-2-pyridone | 1-Aminobenzene-4-β-sulfato-ethylsulfone | " |
| 15 | 2,5-Diaminobenzenesulfonic acid | 1-Aminobenzene-3-β-sulfato-ethylsulfone | 1-Ethyl-4-methyl-6-hydroxy-2-pyridone | 1-Aminobenzene-4-β-sulfato-ethylsulfone | " |
| 16 | 2,5-Diaminobenzenesulfonic acid | 1-Aminobenzene-3-β-sulfato-ethylsulfone | 1-Ethyl-4-methyl-6-hydroxy-2-pyridone | 1-Aminobenzene-3-β-sulfato-ethylsulfone | " |
| 17 | 2-Amino-5-aminomethyl-naphthalene-1-sulfonic acid | N—Ethylaniline-3-β-sulfato-ethylsulfone | 1-Ethyl-4-methyl-6-hydroxy-2-pyridone | 1-Aminobenzene-4-β-sulfato-ethylsulfone | " |
| 18 | 2-Amino-5-aminomethyl-naphthalene-1-sulfonic acid | 1-Aminobenzene-4-β-sulfato-ethylsulfone | 1-Ethyl-4-methyl-6-hydroxy-2-pyridone | 1-Aminobenzene-3-β-sulfato-ethylsulfone | " |
| 19 | 2-Amino-5-aminomethyl-naphthalene-1,7-disulfonic acid | N—Ethylaniline-3-β-sulfato-ethylsulfone | 1-Ethyl-4-methyl-6-hydroxy-2-pyridone | 1-Aminobenzene-3-β-sulfato-ethylsulfone | " |
| 20 | 2-Amino-5-aminomethyl-naphthalene-1,7-disulfonic | N—Ethylaniline-3-β-sulfato-ethylsulfone | 1-Ethyl-4-methyl-6-hydroxy-2-pyridone | 1-Aminobenzene-4-β-sulfato-ethylsulfone | " |

-continued

| No. | A Diamine compound | B Amine compound | C Pyridone compound | D Another amine compound | E Shade on cellulose fiber |
|---|---|---|---|---|---|
| 21 | 2,4-Diamino-benzenesulfonic acid | N—Ethylaniline-3-β-sulfato-ethylsulfone | 1-Methyl-4-carboxy-6-hydroxy-2-pyridone | 1-Aminobenzene-3-β-sulfato-ethylsulfone | ″ |
| 22 | 2,4-Diamino-benzenesulfonic acid | N—Ethylaniline-3-β-sulfato-ethylsulfone | 1-Propyl-4-methyl-6-hydroxy-2-pyridone | 1-Aminobenzene-3-β-sulfato-ethylsulfone | ″ |
| 23 | 2,4-Diamino-benzenesulfonic acid | N—Ethylaniline-3-β-sulfato-ethylsulfone | 1-Ethyl-3-chloro-4-methyl-6-hydroxy-2-pyridone | 1-Aminobenzene-3-β-sulfato-ethylsulfone | ″ |
| 24 | 2,4-Diamino-benzenesulfonic acid | N—Ethylaniline-3-β-sulfato-ethylsulfone | 1-Ethyl-3-carbamoyl-4-methyl-6-hydroxy-2-pyridone | 1-Aminobenzene-3-β-sulfato-ethylsulfone | ″ |
| 25 | 2,4-Diamino-benzenesulfonic acid | N—Ethylaniline-3-β-sulfato-ethylsulfone | 1-Ethyl-3-cyano-4-methyl-6-hydroxy-2-pyridone | 1-Aminobenzene-3-β-sulfato-ethylsulfone | ″ |
| 26 | 4-Methoxy-2,5-diaminobenzene-sulfonic acid | N—Ethylaniline-3-β-sulfato-ethylsulfone | 1-Ethyl-4-methyl-6-hydroxy-2-pyridone | 1-Aminobenzene-3-β-sulfato-ethylsulfone | ″ |
| 27 | 4-Methoxy-2,5-diaminobenzene-sulfonic acid | N—Ethylaniline-3-β-sulfato-ethylsulfone | 1-Ethyl-4-methyl-6-hydroxy-2-pyridone | 1-Aminobenzene-4-β-sulfato-ethylsulfone | ″ |
| 28 | 2,5-Diamino-benzene-1,4-disulfonic acid | N—Ethylaniline-3-β-sulfato-ethylsulfone | 1-Ethyl-4-methyl-6-hydroxy-2-pyridone | 1-Aminobenzene-3-β-sulfato-ethylsulfone | ″ |
| 29 | 2,4-Diamino-5-methyl-benzenesulfonic acid | 1-Aminobenzene-3-β-sulfatoethyl-sulfone | 1-Ethyl-4-methyl-6-hydroxy-2-pyridone | 2-Aminonaph-thalene-8-β-sulfatoethyl-sulfone | ″ |
| 30 | 2,4-Diamino-5-methyl-benzenesulfonic acid | N—Ethylaniline-3-β-sulfato-ethylsulfone | 1-Ethyl-4-methyl-6-hydroxy-2-pyridone | 1-Aminobenzene-3-β-sulfato-ethylsulfone | ″ |
| 31 | 4,6-Diamino-benzene-1,3-disulfonic acid | 1-Amino-4-methoxybenzene-3-β-sulfato-ethylsulfone | 1-Ethyl-4-methyl-6-hydroxy-2-pyridone | 2-Aminonaphtha-lene-8-β-sulfatoethyl-sulfone | ″ |
| 32 | 4,6-Diamino-benzene-1,3-disulfonic acid | N—Methylaniline-4-β-sulfato-ethylsulfone | 1-Ethyl-4-methyl-6-hydroxy-2-pyridone | 1-Aminobenzene-3-vinylsulfone | ″ |
| 33 | 2,4-Diamino-benzenesulfonic acid | N—Methylaniline-3-β-sulfato-ethylsulfone | 1-Ethyl-4-methyl-6-hydroxy-2-pyridone | 1-Aminobenzene-3-β-sulfato-ethylsulfone | ″ |
| 34 | 2,4-Diamino-benzenesulfonic acid | 1-Amino-2-methoxy-5-methylbenzene-4-β-sulfato-ethylsulfone | 1-Ethyl-3-chloro-4-methyl-6-hydroxy-2-pyridone | 1-Aminobenzene-3-β-sulfato-ethylsulfone | ″ |
| 35 | 2-Amino-5-aminomethyl-naphthalene-1-sulfonic acid | N—Methylaniline-3-β-sulfato-ethylsulfone | 1-Ethyl-4-methyl-6-hydroxy-2-pyridone | 1-Aminobenzene-3-β-sulfato-ethylsulfone | ″ |
| 36 | 2-Amino-5-aminomethyl-naphthalene-1-sulfonic acid | N—Methylaniline-3-β-sulfato-ethylsulfone | 1-n-Butyl-4-methyl-6-hydroxy-2-pyridone | 1-Amino-benzene-4-β-sulfatoethyl-sulfone | ″ |

EXAMPLE 4

The monoazo compounds obtained in Examples 1 to 3 each (0.3 part) was dissolved in water (200 parts), and sodium sulfate (10 parts) and cotton (10 parts) were added thereto. The bath was heated to 50° C. 20 minutes thereafter, sodium carbonate (4 parts) was added thereto, and dyeing was continued for 1 hour at that temperature. Thereafter, the cotton taken out was washed with water and soaped to obtain dyed products of a deep yellow color excellent in various fastness properties.

EXAMPLE 5

The monoazo compounds obtained in Examples 1 to 3 each (15 parts) and urea (50 parts) were dissolved in hot water (200 parts). A paste (400 parts) prepared by mixing sodium alginate (40 parts), water (960 parts) and sodium hydrogencarbonate (20 parts) were added thereto. The resulting mixture was mixed with water and the paste to make the whole 1000 parts, thereby preparing a printing paste.

Cotton fabric was printed with the printing paste prepared above. The printed fabric was pre-dried, steamed at 100° to 103° C. for 5 minutes, washed with cool water and then hot water, subjected to boil-soaping, again washed and then dried to obtain printed products of a deep yellow color excellent in various fastness properties.

What is claimed is:

1. A compound represented by the following formula (I),

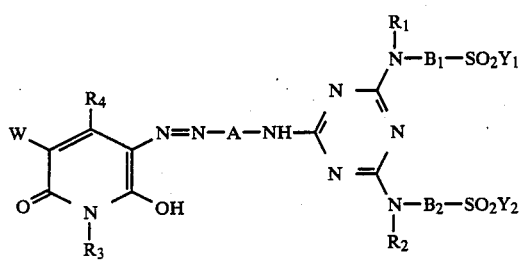

wherein $R_1$ and $R_2$ independently of one another are each hydrogen or unsubstituted or substituted alkyl, $R_3$ is hydrogen or alkyl, $R_4$ is alkyl or carboxy, A is a divalent group represented by the following formula (II) or (III) in each free acid form,

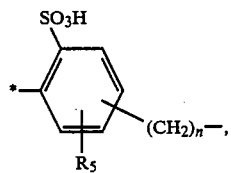

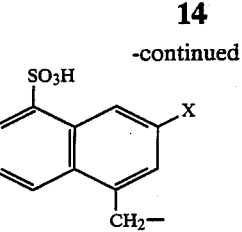

in which $R_5$ is hydrogen, methyl, methoxy, ethoxy, sulfo or carboxy, X is hydrogen or sulfo, n is 0 or 1, and the asterisked linkage bonds to the azo group, $B_1$ and $B_2$ independently of one another are each phenylene unsubstituted or substituted once or twice by methyl, methoxy, ethyl, ethoxy, chloro, bromo, sulfo or carboxy, or naphthylene unsubstituted or substituted by sulfo, W is hydrogen, carbamoyl, sulfoalkyl, cyano, sulfo, chloro or bromo, and $Y_1$ and $Y_2$ independently of one another are each —CH=CH$_2$ or —CH$_2$CH$_2$Z in which Z is a group splittable by the action of an alkali.

2. A compound according to claim 1, wherein $B_1$ and $B_2$ independently of one another are each phenylene unsubstituted or substituted by methyl or methoxy.

3. A compound according to claim 1, wherein any one of $R_1$ and $R_2$ is hydrogen, and the other is hydrogen, methyl or ethyl.

4. A compound according to claim 1, wherein W is hydrogen.

5. A compound according to claim 1, wherein A is a divalent group of the formula (II) as defined in Claim 1 or following formula

*[structure with SO$_3$H and R'$_5$]* wherein the asterisked linkage is as defined in claim 1, and R'$_5$ is hydrogen, methyl, methoxy, sulfo or carboxy.

6. A compound according to claim 1, wherein both $Y_1$ and $Y_2$ are β-sulfatoethyl.

7. A compound represented by the following formula in a free acid form,

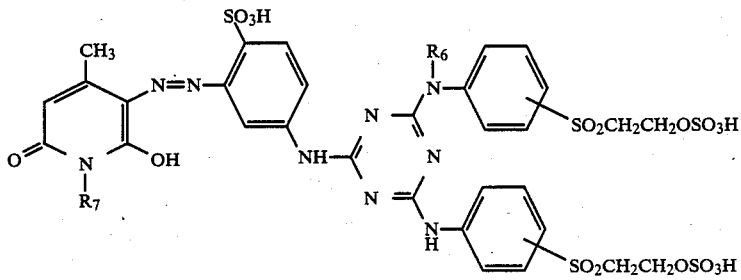

wherein $R_6$ is hydrogen, methyl or ethyl, and $R_7$ is methyl or ethyl.

8. A compound represented by the following formula in a free acid form,

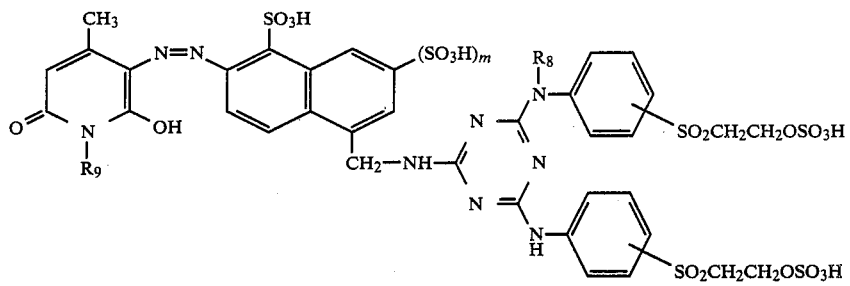

wherein $R_8$ is hydrogen, methyl or ethyl, $R_9$ is methyl or ethyl, and m is 0 or 1.

9. A process for dyeing or printing hydroxy group or carbonamide group-containing materials, which comprises using a compound represented by the following formula (I),

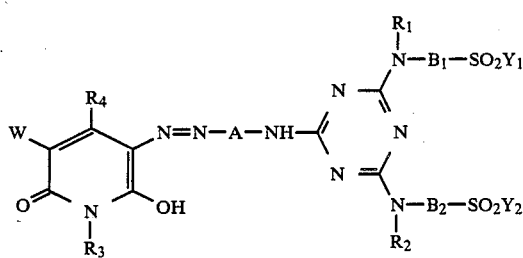

wherein $R_1$ and $R_2$ independently of one another are each hydrogen or unsubstituted or substituted alkyl, $R_3$ is hydrogen or alkyl, $R_4$ is alkyl or carboxy, A is a divalent group represented by the following formula (II) or (III) in each free acid form, in which $R_5$ is hydrogen, methyl, methoxy, ethoxy, sulfo or carboxy, X is hydrogen or sulfo, n is 0 or 1, and the asterisked linkage bonds to the azo group, $B_1$ and $B_2$ independently of one another are each phenylene unsubstituted or substituted once or twice by methyl, methoxy, ethyl, ethoxy, chloro, bromo, sulfo or carboxy, or naphthylene unsubstituted or substituted by sulfo, W is hydrogen, carbamoyl, sulfoalkyl, cyano, sulfo, chloro or bromo, and $Y_1$ and $Y_2$ independently of one another are each —CH=CH$_2$ or —CH$_2$CH$_2$Z in which Z is a group splittable by the action of an alkali.

10. Hydroxy group- or carbonamide group-containing materials dyed or printed by the process of claim 9.

* * * * *